United States Patent
Yang

(10) Patent No.: US 12,127,055 B2
(45) Date of Patent: Oct. 22, 2024

(54) METHOD FOR PROCESSING LINK FAILURE INFORMATION AND ELECTRONIC DEVICE

(71) Applicant: BEIJING XIAOMI MOBILE SOFTWARE CO., LTD., Beijing (CN)

(72) Inventor: Xing Yang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 330 days.

(21) Appl. No.: 17/763,589

(22) PCT Filed: Sep. 27, 2019

(86) PCT No.: PCT/CN2019/108478
§ 371 (c)(1),
(2) Date: Mar. 24, 2022

(87) PCT Pub. No.: WO2021/056403
PCT Pub. Date: Apr. 1, 2021

(65) Prior Publication Data
US 2022/0330108 A1    Oct. 13, 2022

(51) Int. Cl.
*H04W 36/00* (2009.01)
*H04W 36/36* (2009.01)

(52) U.S. Cl.
CPC .. *H04W 36/0079* (2018.08); *H04W 36/00838* (2023.05); *H04W 36/362* (2023.05)

(58) Field of Classification Search
None
See application file for complete search history.

(56) References Cited

U.S. PATENT DOCUMENTS

2022/0174562 A1* 6/2022 Da Silva ............... H04W 76/27
2022/0264394 A1* 8/2022 Wang .................. H04W 36/362

FOREIGN PATENT DOCUMENTS

WO    WO 2019175463 A1    9/2019

OTHER PUBLICATIONS

European Patent Application No. 19946919.8, Search and Opinion dated May 25, 2023, 11 pages.
NEC "RLF report for CHO" 3GPP TSG-RAN WG2 #107, R2-1909660, Aug. 2019, 3 pages.

* cited by examiner

*Primary Examiner* — Christine T Duong
(74) *Attorney, Agent, or Firm* — Cozen O'Connor

(57) ABSTRACT

A method for processing link failure information includes in response to a conditional handover failure, determining by a terminal, a trigger condition of the conditional handover; and determining by the terminal, whether to remove stored link failure information based on the trigger condition.

20 Claims, 5 Drawing Sheets

--- in response to a conditional handover failure, determining a trigger condition of the conditional handover — S1 determining whether to remove stored link failure information based on the trigger condition — S2

METHOD FOR PROCESSING LINK FAILURE INFORMATION AND ELECTRONIC DEVICE

CROSS-REFERENCE TO RELATED APPLICATION

This application is the U.S. national application of International Application No. PCT/CN2019/108478, filed on Sep. 27, 2019, the entire contents of which are incorporated herein by reference for all purposes.

TECHNICAL FIELD

The disclosure relates to the field of communication technology, in particular to a method for processing link failure information, and an electronic device.

BACKGROUND

During the communication between a user equipment (UE) and a base station, the UE may hand over to a cell, i.e., the cell where the UE is located.

In the 4G long term evolution (LTE) technology, a conventional handover (CHO) operation includes: the UE can measure a cell and report a measurement result to the base station; the base station sends a handover request to a target cell to which the UE needs to hand over based on the measurement result and may send a handover command carried with configuration information for handover to the UE, in response to the target cell confirming that the UE is allowed to hand over; the UE can hand over to the target cell based on the configuration information.

In order to improve the robustness of handover, in the 5G new radio (NR) technology, a conditional handover is proposed. The UE does not need to report the measurement result to the base station, and the base station sends preset conditions and a target cell that can be handed over to the UE in advance. When a network environment where the UE is located satisfies the preset conditions, the UE can hand over to the target cell.

For a conventional handover and a conditional handover, link failure (LF) may occur if the handover fails. When the UE fails to send links, link failure information can be stored for reporting to the base station, so that the base station can determine information for the network environment where the UE is located when the link failure occurs and optimize the network. However in the related art, the UE only stores the latest link failure information. That is, when a new link failure occurs, the stored link failure information may be removed, and new link failure information may be stored.

SUMMARY

According to a first aspect of the present disclosure, a method for processing link failure information is provided. The method includes: in response to a conditional handover failing, determining by a terminal, a trigger condition of the conditional handover; and determining by the terminal, whether to remove stored link failure information based on the trigger condition.

According to a second aspect of the present disclosure, an electronic device is provided. The electronic device includes: a processor and a memory for storing instructions executable by the processor. The processor is configured to in response to a conditional handover failure, determine a trigger condition of the conditional handover; and determine whether to remove stored link failure information based on the trigger condition.

BRIEF DESCRIPTION OF THE DRAWINGS

In order to illustrate the technical solutions in the embodiments of the present disclosure more clearly, the accompanying drawings used in the description of the embodiments are briefly introduced below. The accompanying drawings in the following description are only some embodiments of the present disclosure. Other drawings can also be obtained from these drawings without creative labor by those skilled in the art.

DETAILED DESCRIPTION

The technical solutions in the embodiments of the present disclosure will be clearly and completely described below with reference to the accompanying drawings in the embodiments of the present disclosure. The described embodiments are only a part of the embodiments of the present disclosure, but not all of the embodiments. Based on the embodiments in the present disclosure, all other embodiments obtained by those skilled in the art without creative efforts shall fall within the protection scope of the present disclosure.

In addition that link failures may occur when a conventional handover and the CHO fails, it may also be determined that a link failure has occurred when a radio link failure (RLF) occurs in the UE.

When a link failure has occurred in the UE, cell selection may be performed. When the selected cell happens to be a target cell designated by the CHO, selecting by the EU the target cell for access is equivalent to performing the CHO again. When the UE fails to perform another CHO in the above manner, it may also be determined that a link failure has occurred. As such, the stored link failure information may be removed in a way of storing the link failure information in the related art.

However, the action that triggers another link failure is based on the CHO failure and the trigger conditions for the CHO are not identical. When the CHO under each of the trigger conditions fails, the stored link failure information is removed, which may cause that the base station cannot fully understand a situation of the network where the terminal is located based on the link failure information and is not helpful for the base station to optimize the network.

Figure 1:
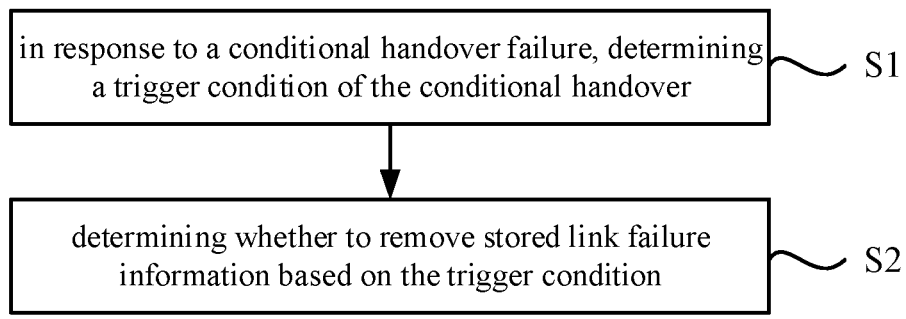
FIG. 1 is a schematic flowchart of a method for processing link failure information according to an embodiment of the present disclosure.

FIG. 1 is a schematic flowchart of a method for processing link failure information according to an embodiment of the present disclosure. The method shown in this embodiment can be applied to a terminal, which includes but is not limited to an electronic device such as a mobile phone, a tablet computer, and a wearable device. The terminal may be served as a UE (UE) to communicate with the base station for example based on the 4G LTE technology, or based on the 5G NR technology (The following embodiment is mainly described in a situation that the terminal is served as the UE).

As shown in FIG. 1, the method for processing link failure information may include the following steps.

At S1, in response to a conditional handover failure, a trigger condition of the conditional handover is determined.

At S2, it is determined based on the trigger condition whether to remove stored link failure information.

In an embodiment, the link failure information includes but is not limited to, a cell where the UE (that is, the terminal) is located when the link fails, measurement data of the cell where the UE is located, location information of the UE, a cell-radio network temporary identifier (C-RNTI) used by the UE before the link fails, the reason why the link fails (such as a radio link failure, a handover failure, a CHO failure), etc. When the link failure is caused by the CHO, the link failure information may further include a target cell for the CHO indicated by the base station to the UE.

For the stored link failure information, the UE may report the link failure information to the base station after the UE establishes a connection with the base station (including connection establishment, connection re-establishment, connection recovery, etc.). The base station may determine the network environment when the link failure occurs in the UE based on the received link failure information, thus optimizing the network in a targeted manner and improving the communication effect of the UE.

According to the embodiment of the present disclosure, when the CHO failure occurs in the terminal, although a link failure also occurs, the stored link failure information may not be removed immediately, but a trigger condition of the CHO failure can be determined first.

When the trigger condition of the CHO is a network environment of the terminal satisfying a preset condition of the CHO, which is a general condition for triggering the CHO, the stored link failure information is previous link failure information.

In general, the network environment where the UE is located may not frequently satisfy the preset condition based on the CHO, i.e., the UE may not be frequently based on the CHO. A time interval between the previous link failure and the current CHO failure is generally long. The network environment where the UE is located generally has undergone major changes. In this case, the previous link failure information has a weak reference value for the base station to optimize the network, and the current link failure information may enable the base station to identify the network environment where the UE is located when the current link failure occurs. The stored link failure information may be removed accordingly and information of the link failure caused by the current CHO failure can be stored.

The CHO may be triggered in response to the network environment of the UE satisfying the preset condition based on CHO, and may be also triggered after the link fails. Specifically, after the link fails and the UE selects a cell, the selected cell happens to be the target cell designated by the CHO, and selecting by the UE the target cell for access is equivalent to performing the CHO again.

The link failure may include a radio link failure, a CHO failure, a handover failure (i.e., conventional handover operations in the 4G LTE fails) and the like. That is, there are mainly three cases.

In Case 1, after the radio link fails, the UE can perform a CHO during cell selection;

In Case 2, after the CHO fails, the UE can perform a CHO during cell selection. In this case, there are two times of CHO. In order to distinguish the two times of CHO, the CHO during cell selection is called a second CHO and the CHO at the previous time is called a first CHO;

In Case 3, after the handover fails, the UE can perform a CHO during cell selection.

For the above Case 1, the CHO is triggered by the radio link failure rather than by the network environment of the UE satisfying a preset condition, the network environment that actually leads to the link failure is the network environment of the UE when the radio link failure occurs, instead of the network environment of the UE when the CHO failure occurs.

When the radio link failure occurs, the UE has determined that a link failure has occurred, and has recorded the link failure information, including a reason for the link failure being the radio link failure. When the CHO failure occurs, the stored link failure information is removed and new link failure information is recorded. The network environment corresponding to the newly recorded link failure information is the network environment of the UE based on the CHO failure, rather than the network environment of the UE based on the radio link failure (i.e., the network environment that actually leads to the link failure of UE). Sending the newly recorded link failure to the base station may cause the base station to be unable to accurately determine a situation of the network environment that actually leads to the link failure of UE.

For the above Case 2, the second CHO is triggered by the first CHO failure rather than the network environment of the UE satisfying the preset condition, the network environment that actually leads to the link failure is the network environment of the UE when the first CHO failure occurs, rather than the network environment of the UE when the second CHO failure occurs.

When the first CHO failure occurs, the UE has determined that a link failure has occurred, and has recorded the link failure information, including a reason for the link failure being the CHO failure. When the second CHO failure occurs, the stored link failure information is removed, and new link failure information is recorded. The network environment corresponding to the newly recorded link failure information is the network environment of UE when the second CHO failure occurs, rather than the network environment of the UE when the first CHO failure occurs (i.e., the network environment that actually leads to the link failure). Sending the newly recorded link failure to the base station may cause the base station to be unable to accurately determine a situation of the network environment that actually leads to the link failure of UE.

For the above Case 3, the CHO is triggered by the handover failure rather than by the network environment of the UE satisfying the preset condition, the network environment that actually leads to the link failure is the network environment of UE when the handover failure occurs, rather than the network environment of the UE when the CHO failure occurs.

When the handover failure occurs, the UE has determined that a link failure has occurred, and has recorded the link failure information, including a reason for the link failure being the handover failure. When the CHO failure occurs, the stored link failure information is removed and new link failure information is recorded. The network environment corresponding to the newly recorded link failure information is the network environment of UE when the CHO failure occurs, rather than the network environment of the UE when the handover failure occurs (i.e., the network environment that actually leads to the link failure). Sending the newly recorded link failure to the base station may cause the base station to be unable to accurately determine a situation of the network environment that actually leads to the link failure of UE.

According to the embodiments of the present disclosure, it can be determined whether to remove the stored link failure information based on the trigger condition of the CHO failure. For example, when the trigger condition is a network environment of the terminal satisfying a preset condition of the CHO, the stored link failure information can be removed. For the above Case 1, Case 2 and Case 3, the stored link failure information can be retained, so as to ensure that the stored link failure information is sent to the base station, and the base station can identify the network environment that leads to the link failure of UE, which is helpful for the base station to optimize the network.

Alternatively, the trigger condition includes one of the following:

a radio link failure, a conditional handover failure, a handover failure, and a network environment of the terminal satisfying a preset condition of the conditional handover.

Figure 2:
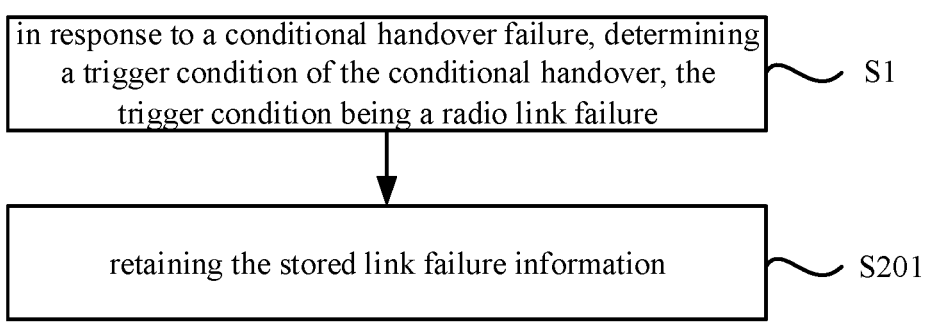
FIG. 2 is a schematic flowchart of another method for processing link failure information according to an embodiment of the present disclosure.

FIG. 2 is a schematic flowchart of another method for processing link failure information according to an embodiment of the present disclosure. As shown in FIG. 2, the trigger condition is a radio link failure, and determining whether to remove stored link failure information based on the trigger condition includes the following step at S201.

At S201, the stored link failure information is retained.

In an embodiment, when a conditional handover (CHO) is triggered by the radio link failure rather than the network environment of the UE satisfying the preset condition, the network environment that actually leads to the link failure is the network environment of the UE when the radio link failure occurs, rather than the network environment of the UE when the CHO failure occurs.

When the radio link failure occurs, the UE has determined that a link failure has occurred, and has recorded the link failure information, including a reason for the link failure being the radio link failure. When the CHO failure occurs, the stored link failure information is removed and new link failure information is recorded. The network environment corresponding to the newly recorded link failure information is the network environment of the UE based on the CHO failure, rather than the network environment of the UE based on the radio link failure (i.e., the network environment that actually leads to the link failure). Sending the newly recorded link failure to the base station may cause the base station to be unable to accurately determine a situation of the network environment that actually leads to the link failure of UE.

In the embodiment, the stored link failure information is retained, that is, the stored link failure information is not removed, so that when the link failure information is reported to the base station, the stored link failure information (information of the radio link failure) may be sent to the base station, and the base station can identify the network environment that leads to the link failure of the UE, which is helpful for the base station to optimize the network.

Figure 3:
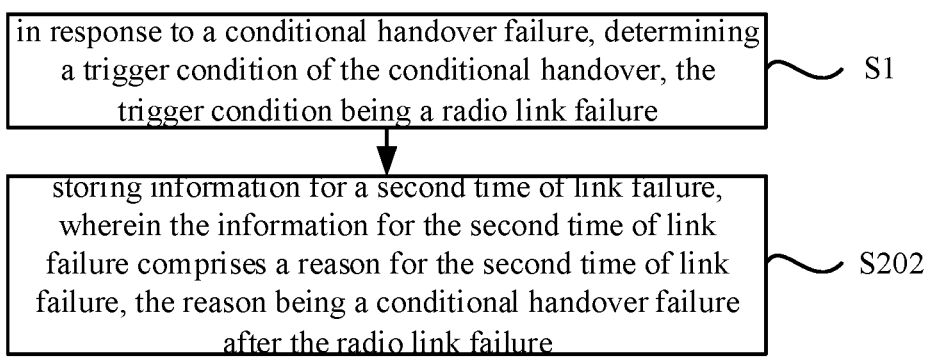
FIG. 3 is a schematic flowchart of yet another method for processing link failure information according to an embodiment of the present disclosure.

FIG. 3 is a schematic flowchart of yet another method for processing link failure information according to an embodiment of the present disclosure. As shown in FIG. 3, the trigger condition is a radio link failure, and determining whether to remove the stored link failure information based on the trigger condition further includes the following step at S202.

At S202, information for another link failure is stored. The information of another link failure includes a reason for another link failure being a conditional handover (CHO) failure after the radio link failure.

In an embodiment, when the trigger condition is the radio link failure, in addition to retaining the stored link failure information, information for another link failure can also be stored, and a reason for another link failure is indicated in the information of another link failure. The reason is the CHO failure after the radio link failure. Furthermore, when the link failure information is reported to the base station, the stored link failure information and the newly stored information of another link failure can be reported to the base station, so that the base station can comprehensively determine a specific situation of the two link failures, which is helpful for the base station to optimize the network.

Figure 4:
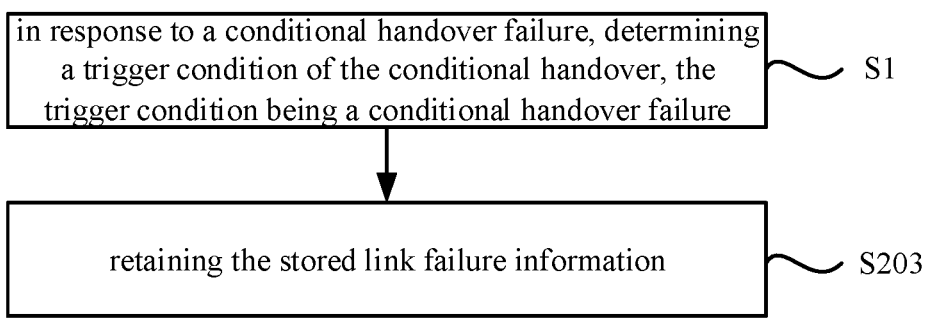
FIG. 4 is a schematic flowchart of yet another method for processing link failure information according to an embodiment of the present disclosure.

FIG. 4 is a schematic flowchart of yet another method for processing link failure information according to an embodiment of the present disclosure. As shown in FIG. 4, the trigger condition is a conditional handover (CHO) failure (i.e., the first CHO failure), and determining whether to remove the stored link failure information based on the trigger condition includes the following step at S203.

At S203, the stored link failure information is retained.

In an embodiment, when the second CHO is triggered by the first CHO failure rather than the network environment of the UE satisfying the preset condition, the network environment that actually leads to the link failure is the network environment of the UE when the first CHO failure occurs, rather than the network environment of the UE when the second CHO failure occurs.

When the first CHO failure occurs, the UE has determined that a link failure has occurred, and has recorded the link failure information, including a reason for the link failure being the CHO failure. When the second CHO failure occurs, the stored link failure information is removed and new link failure information is recorded. The network environment corresponding to the newly recorded link failure information is the network environment of UE when the second CHO failure occurs, rather than the network environment of the UE when the first CHO failure occurs (i.e., the network environment that actually leads to the link failure). Sending the newly recorded link failure to the base station may cause the base station to be unable to accurately determine a situation of the network environment that actually leads to the link failure of UE.

In the embodiment, the stored link failure information is retained, that is, the stored link failure information is not removed, so that when the link failure information is reported to the base station, the stored link failure information (i.e., information of the first CHO failure) is sent to the base station, and the base station can identify the network environment that leads to the link failure of the UE, which is helpful for the base station to optimize the network.

Figure 5:
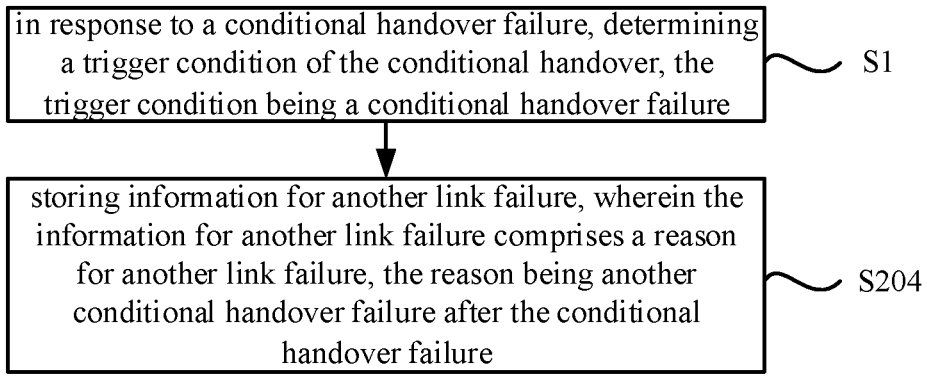
FIG. 5 is a schematic flowchart of yet another method for processing link failure information according to an embodiment of the present disclosure.

FIG. 5 is a schematic flowchart of yet another method for processing link failure information according to an embodiment of the present disclosure. As shown in FIG. 5, the trigger condition is a conditional handover (CHO) failure and determining whether to remove the stored link failure information based on the trigger condition further includes the following step at S204.

At S204, information for another link failure is stored. The information of another link failure includes a reason for another link failure being another CHO failure after the CHO failure.

In an embodiment, when the trigger condition is a CHO failure, in addition to retaining the stored link failure information, the information of another link failure can also be stored, and a reason for another link failure can be indicated in the information of another link failure. The reason for another link failure is another CHO failure after the first CHO failure. Furthermore, when the link failure information is reported to the base station, the stored link failure information and the newly stored information of another link failure can be reported to the base station, so that the base station can comprehensively determine a specific situation of the two link failures, which is helpful for the base station to optimize the network.

Figure 6:
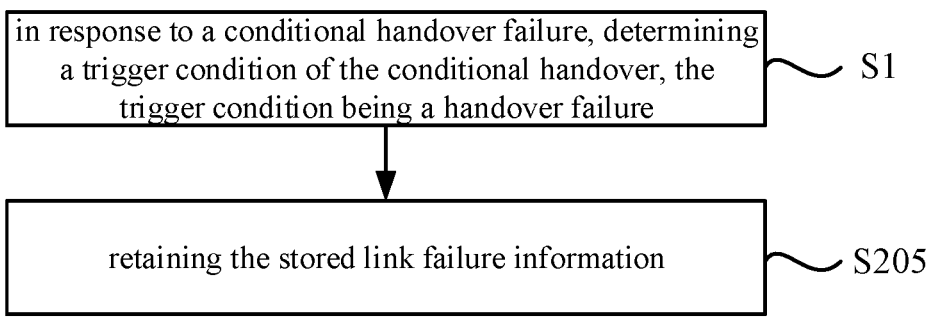
FIG. 6 is a schematic flowchart of yet another method for processing link failure information according to an embodiment of the present disclosure.

FIG. 6 is a schematic flowchart of yet another method for processing link failure information according to an embodiment of the present disclosure. As shown in FIG. 6, the trigger condition is a handover failure, and determining whether to remove the stored link failure information based on the trigger condition includes the following step at S205.

At S205, the stored link failure information is retained.

In an embodiment, when a conditional handover (CHO) is the CHO is triggered by the handover failure rather than by the network environment of the UE satisfying the preset condition, the network environment that actually leads to the link failure is the network environment of UE when the handover failure occurs, rather than the network environment of the UE when the CHO failure occurs.

When the handover failure occurs, the UE has determined that a link failure has occurred, and has recorded the link failure information, including a reason for the link failure being the handover failure. When the CHO failure occurs, the stored link failure information is removed and new link failure information is recorded. The network environment corresponding to the newly recorded link failure information is the network environment of UE when the CHO failure occurs, rather than the network environment of the UE when the handover failure occurs (i.e., the network environment that actually leads to the link failure). Sending the newly recorded link failure to the base station may cause the base station to be unable to accurately determine a situation of the network environment that actually leads to the link failure of UE.

In the embodiment, the stored link failure information is retained, that is, the stored link failure information is not removed, so that when the link failure information is reported to the base station, the stored link failure information (i.e., information of the handover failure) is sent to the base station, and the base station can identify the network environment that leads to the link failure of the UE, which is helpful for the base station to optimize the network.

Figure 7:
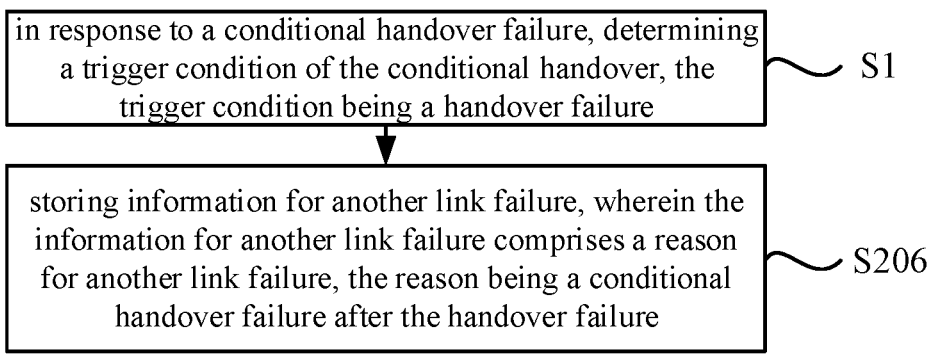
FIG. 7 is a schematic flowchart of yet another method for processing link failure information according to an embodiment of the present disclosure.

FIG. 7 is a schematic flowchart of yet another method for processing link failure information according to an embodiment of the present disclosure. As shown in FIG. 7, the trigger condition is a conditional handover (CHO) and determining whether to remove the stored link failure information based on the trigger condition further includes the following step at S206.

At S206, information for another link failure is stored. The information of another link failure includes a reason for another link failure being the CHO failure after the handover failure.

In an embodiment, when the trigger condition is a handover failure, in addition to retaining the stored link failure information, the information of another link failure can also be stored, and a reason for another link failure can be indicated in the information of another link failure. The reason for another link failure is the CHO failure after the handover failure. Furthermore, when the link failure information is reported to the base station, the stored link failure information and the newly stored information of another link failure can be reported to the base station, so that the base station can comprehensively determine a specific situation of the two link failures, which is helpful for the base station to optimize the network.

Figure 8:
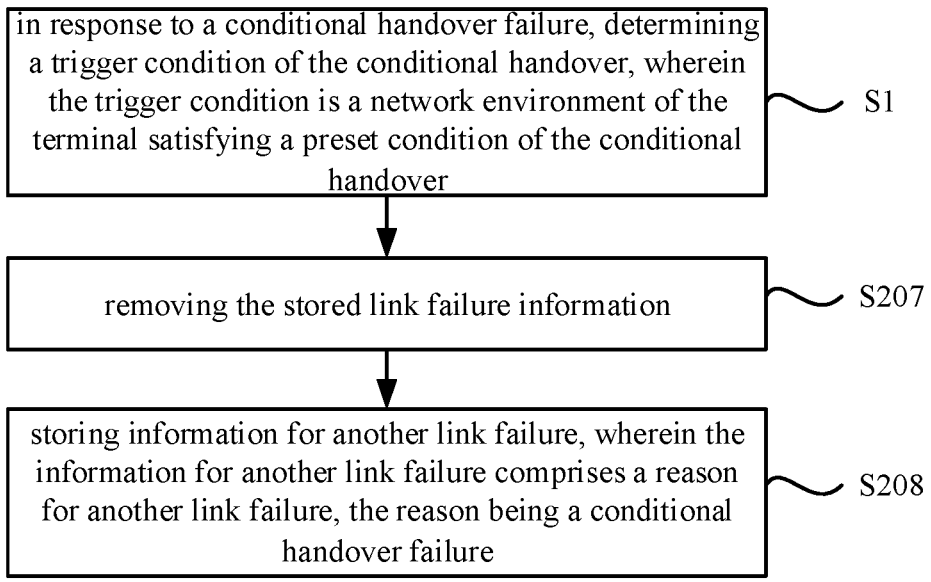
FIG. 8 is a schematic flowchart of yet another method for processing link failure information according to an embodiment of the present disclosure.

FIG. 8 is a schematic flowchart of yet another method for processing link failure information according to an embodiment of the present disclosure. As shown in FIG. 8, the trigger condition is the network environment of the terminal satisfying a preset condition of a conditional handover (CHO) and determining whether to remove the stored link failure information based on the trigger condition further includes the following steps at S207-S208.

At S207, the stored link failure information is removed.

At S208, information for another link failure is stored. The information of another link failure includes a reason for another link failure being the CHO failure.

In an embodiment, when the trigger condition of CHO is a network environment of the UE satisfying a preset condition of CHO, which is a general condition for triggering the CHO, the stored link failure information is previous link failure information. However, the current link failure information may enable the base station to identify the network environment where the UE is located when the current link failure occurs. The stored link failure information may be removed accordingly, and information of the link failure caused by the current CHO failure can be stored. As such, the storage space occupied by the UE is reduced.

Figure 9:
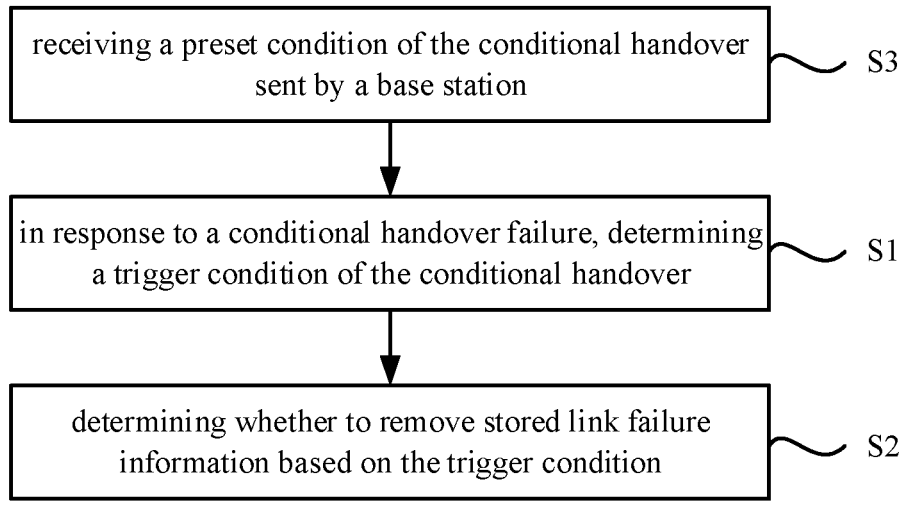
FIG. 9 is a schematic flowchart of yet another method for processing link failure information according to an embodiment of the present disclosure.

FIG. 9 is a schematic flowchart of yet another method for processing link failure information according to an embodiment of the present disclosure. As shown in FIG. 9, before determining the trigger condition of a conditional handover (CHO), the method further includes the following step at S3.

At S3, a preset condition of CHO sent by the base station is received.

In an embodiment, the preset condition of CHO sent by the base station may be received first, so as to determine the target cell of CHO and determine the target cell during a subsequent operation of performing the CHO.

The preset condition includes but is not limited to, identifiers of one or more target cells, handover trigger conditions, configuration of the target cells, etc. Based on the identifiers, the UE can determine one or more target cells, and when the network environment of the UE satisfies the handover trigger condition in the preset condition, the CHO may be triggered so that the UE attempts to hand over to the target cell.

For example, the preset condition includes identifiers of 3 cells and handover trigger conditions corresponding to the 3 cells:

In Cell 1, the handover trigger condition is that a reference signal receiving power (RSRP) of a serving cell is lower than −98 db, and the RSRP of cell 1 is higher than −98 db.

In Cell 2, the handover trigger condition is that the RSRP of cell 2 is 3 db higher than that of the serving cell.

In Cell 3, the handover trigger condition is that the RSRP of cell 3 is higher than −98 db.

In an embodiment, when the UE detects that the network environment where it is located satisfies the condition for handover to cell 2, CHO is performed to hand over to cell 2, and when the handover to cell 2 fails due to some reasons, the CHO failure occurs, and the trigger condition of CHO can be determined. Specifically, when the trigger condition is the network environment of the UE satisfying the preset condition of CHO, the stored link failure information can be removed and new link failure information is stored according to the embodiment shown in FIG. 7, where the new link failure information may include a failure reason being a CHO failure, and the handover trigger condition of cell 2.

Then, the UE can perform cell selection. For example, the selection result is cell 3, and cell 3 belongs to the target cell of CHO. The UE may hand over to cell 3. When the UE also fails to hand over to cell 3, the second CHO failure occurs and the trigger condition of the CHO (the second CHO) can be determined. Specifically, when the trigger condition is a CHO failure, the stored link failure information can be retained according to the embodiment shown in FIG. 4, that is, the link failure information recorded when the first time of link failure is retained. The information of another link failure can also be further stored according to the embodiment shown in FIG. 5. The reason for another link failure is indicated in the information of another link failure, the reason being another CHO failure after the first CHO failure.

In an embodiment, when a radio link failure occurs in the UE, which also belongs to a link failure situation, the stored link failure information can be thus removed, and new link failure information can be stored, that is, the radio link failure information can be stored.

The UE can then perform cell selection. For example, the selection result is cell that belongs to a target cell of CHO, and the UE may hand over to cell 1. When the UE fails to hand over to cell 1, another CHO failure occurs, and the trigger condition of CHO can be determined. Specifically, when the trigger condition is a radio link failure, the stored link failure information can be retained according to the embodiment shown in FIG. 2, that is, the link failure information recorded when the radio link failure occurs is retained. The information of another link failure can also be further stored according to the embodiment shown in FIG. 3. The reason for another link failure is indicated in the information of another link failure, the reason being a CHO failure after the radio link failure.

Corresponding to the foregoing embodiments of the method for processing link failure information, the present disclosure also provides embodiments of the apparatus for processing link failure information.

Figure 10:
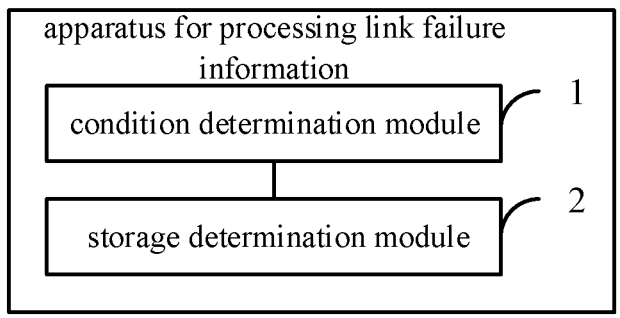
FIG. 10 is a schematic block diagram of an apparatus for processing link failure information according to an embodiment of the present disclosure.

FIG. 10 is a schematic block diagram of an apparatus for processing link failure information according to an embodiment of the present disclosure. The apparatus shown in this embodiment can be applied to a terminal, which includes but are not limited to an electronic device such as a mobile phone, a tablet computer, and a wearable device. The terminal may be served as a UE (UE) to communicate with the base station for example based on the 4G LTE technology, or based on the 5G NR technology (The following embodiment is mainly described in a situation that the terminal is served as the UE).

As shown in FIG. 10, the apparatus for processing link failure information may include a condition determination module 1 and a storage determination module 2.

The condition determination module 1 is configured to determine a trigger condition of the conditional handover.

The storage determination module 2 is configured to determine whether to remove stored link failure information based on the trigger condition.

Alternatively, the trigger condition includes one of:
a radio link failure, a conditional handover failure, a handover failure, and a network environment of the terminal satisfying a preset condition of the conditional handover.

Alternatively, the trigger condition is a radio link failure, and the storage determination module is configured to retain the stored link failure information.

Alternatively, the trigger condition is a radio link failure, and the storage determination module is configured to store information for another link failure. The information for another link failure includes a reason for another link failure, the reason being the conditional handover failure after the radio link failure.

Alternatively, the trigger condition is based on a conditional handover failure, and the storage determination module is configured to retain the stored link failure information.

Alternatively, the trigger condition is based on a conditional handover failure, and the storage determination module is configured to store information for another link failure. The information for another link failure includes a reason for another link failure, the reason being another conditional handover failure after the conditional handover failure.

Alternatively, the trigger condition is a handover failure, and the storage determination module is configured to retain the stored link failure information.

Alternatively, the trigger condition is a conditional handover failure, and the storage determination module is configured to store information for another link failure. The information for another link failure includes a reason for another link failure, the reason being a conditional handover failure after the handover failure.

Figure 11:
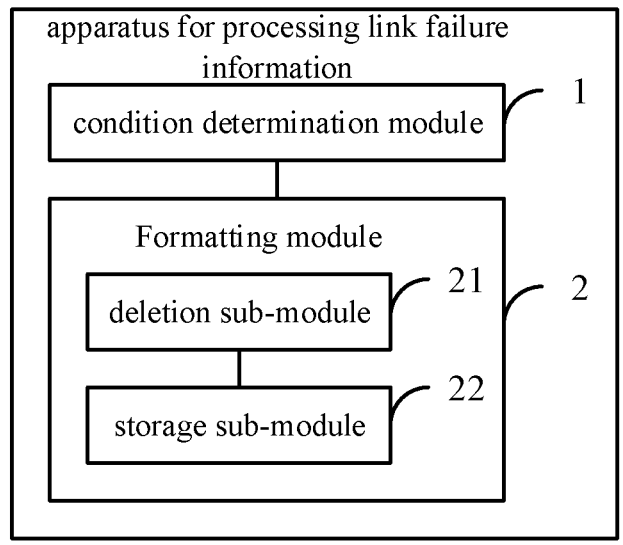
FIG. 11 is a schematic block diagram of another apparatus for processing link failure information according to an embodiment of the present disclosure.

FIG. 11 is a schematic block diagram of another apparatus for processing information link failure according to an embodiment of the present disclosure. As shown in FIG. 11, the trigger condition is a network environment of the terminal satisfying a preset condition of a conditional handover, and the storage determination module 2 includes a deletion sub-module 21 and a storage sub-module 22.

The deletion sub-module 21 is configured to remove the stored link failure information;

The storage sub-module 22 is configured to store information for another link failure. The information for another link failure includes a reason for another link failure, the reason being a conditional handover failure.

Figure 12:
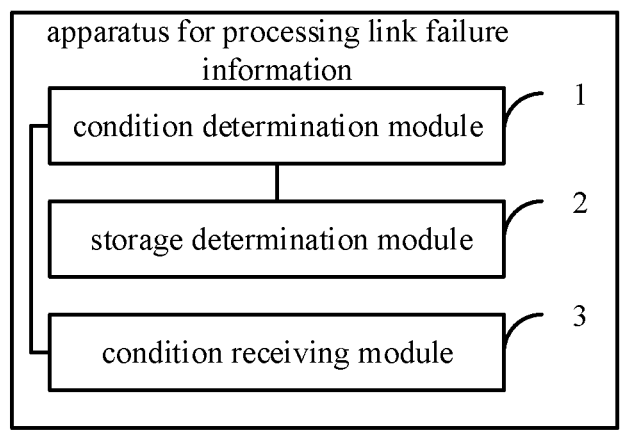
FIG. 12 is a schematic block diagram of yet another apparatus for processing link failure information according to an embodiment of the present disclosure.

FIG. 12 is a schematic block diagram of yet another apparatus for processing link failure information according to an embodiment of the present disclosure. As shown in FIG. 12, the apparatus further includes a condition receiving module 3.

The condition receiving module 3 is configured to receive a preset condition of the conditional handover sent by a base station.

Regarding the apparatuses in the foregoing embodiments, the specific manners in which each module performs operations have been described in detail in the embodiments of the related methods, which may not be described in detail here.

For the apparatus embodiments, since they basically correspond to the method embodiments, reference may be made to a part of descriptions in the method embodiments for related parts. The apparatus embodiments described above are only illustrative, where the modules described as separate components may or may not be physically separated, and the components displayed as modules may or may not be physical modules, that is, they may be located in one place, or can be distributed over multiple network modules. Some or all of the modules may be selected according to actual needs to achieve the purpose of the solution in the embodiments. Those skilled in the art can understand and implement the embodiments without creative effort.

Embodiments of the present disclosure also provide an electronic device, including:

a processor; and a memory for storing instructions executable by the processor;

The processor is configured to implement the method described in any of the above embodiments.

Figure 13:
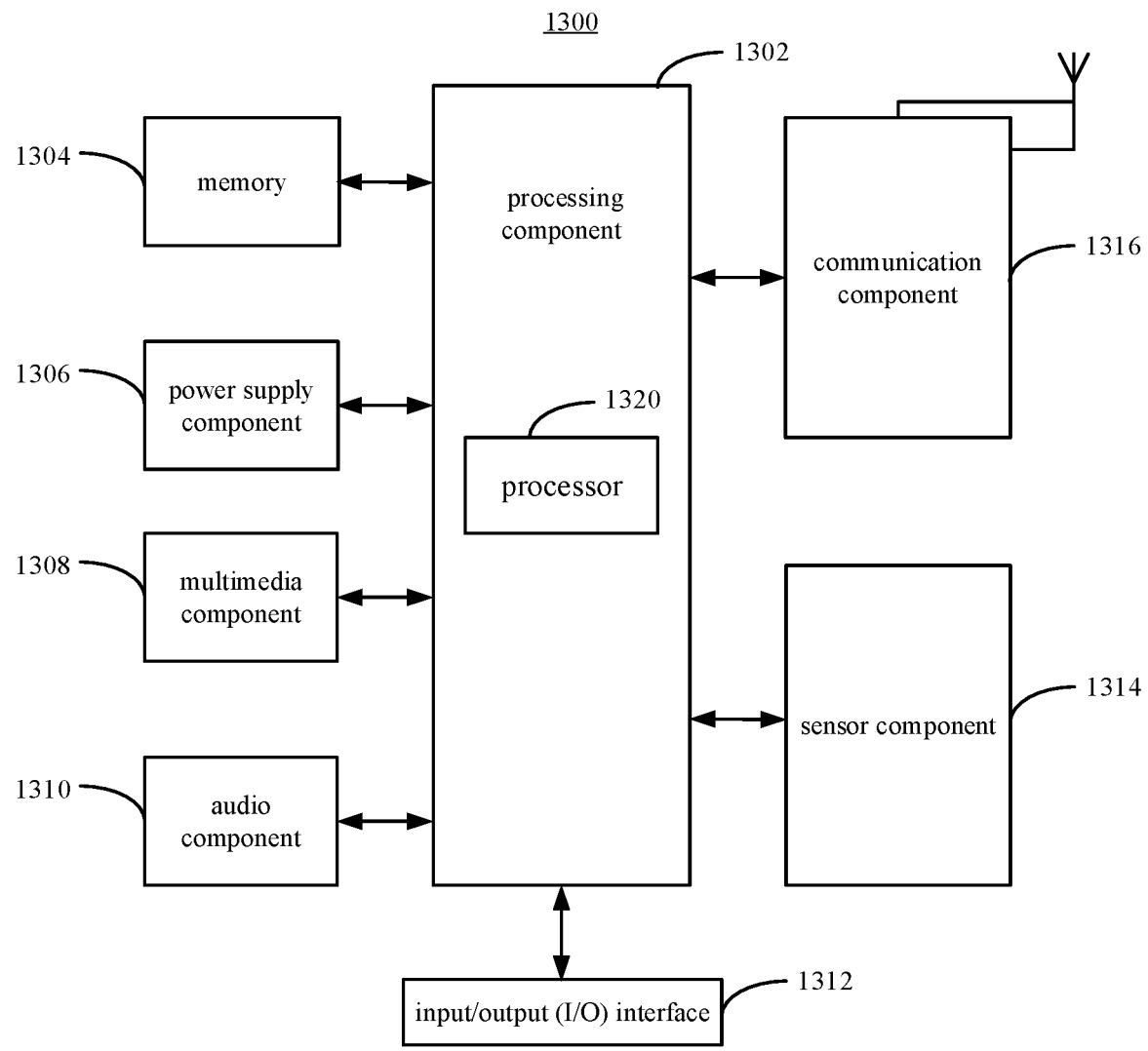
FIG. 13 is a schematic block diagram of a device for processing link failure information according to an embodiment of the present disclosure.

FIG. 13 is a schematic block diagram of a device 1300 for processing link failure information according to an embodiment of the present disclosure. For example, the device 1300 may be a mobile phone, a computer, a digital broadcast terminal, a messaging device, a game console, a tablet device, a medical device, a fitness device, a personal digital assistant, and the like.

Referring to FIG. 13, the device 1300 may include one or more of the following components: a processing component 1302, a memory 1304, a power supply component 1306, a multimedia component 1308, an audio component 1310, an input/output (I/O) interface 1312, a sensor component 1314, and a communication component 1316.

The processing component 1302 generally controls overall operations of the device 1300, such as operations associated with display, phone calls, data communications, camera operations, and recording operations. The processing component 1302 can include one or more processors 1320 to execute instructions to perform all or part of the steps of the methods described above. Additionally, the processing component 1302 may include one or more modules that facilitate interactions between processing component 1302 and other components. For example, the processing component 1302 may include a multimedia module to facilitate interactions between the multimedia component 1308 and the processing component 1302.

The memory 1304 is configured to store various types of data to support operations at device 1300. Examples of such data include instructions for any application or method operating on device 1300, contact data, phonebook data, messages, pictures, videos, and the like. The memory 1304 may be implemented by any type of volatile or non-volatile storage device or their combination, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power supply component 1306 provides power to various components of the device 1300. The power supply component 1306 may include a power management system, one or more power supplies, and other components associated with generating, managing, and distributing power in the device 1300.

The multimedia component 1308 includes a screen that provides an output interface between the device 1300 and the user. In some embodiments, the screen may include a liquid crystal display (LCD) and a touch panel (TP). If the screen includes the touch panel, the screen may be implemented as a touch screen to receive input signals from a user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 1308 includes a front-facing camera and/or a rear-facing camera. When the device 1300 is in an operation mode, such as a shooting mode or a video mode, the front camera and/or the rear camera may receive external multimedia data. Each of the front and rear cameras may be a fixed optical lens system or have a focal length and optical zoom capability.

The audio component 1310 is configured to output and/or input audio signals. For example, the audio component 1310 includes a microphone (MIC) that is configured to receive external audio signals when device 1300 is in an operating mode, such as a call mode, a recording mode, and a voice recognition mode. The received audio signal may be further stored in the memory 1304 or transmitted via the communication component 1316. In some embodiments, the audio component 1310 also includes a speaker for outputting audio signals.

The I/O interface 1312 provides an interface between the processing component 1302 and a peripheral interface module, which may be a keyboard, a click wheel, a button, or the like. These buttons may include, but are not limited to: a home button, a volume button, a starting button, and a locking button.

The sensor assembly 1314 includes one or more sensors for providing status assessments of various aspects of device 1300. For example, the sensor assembly 1314 may detect an open/closed state of the device 1300, relative positioning of the components, e.g., the display and the keypad, of the device 1300, a change in position of the device 1300 or a component of the device 1300, a presence or absence of user contact with the device 1300, an orientation or an acceleration/deceleration of the device 1300 and a change in temperature of the device 1300. The sensor assembly 1314 may include a proximity sensor configured to detect a presence of nearby objects in the absence of any physical contact. The sensor assembly 1314 may also include a light sensor, such as a CMOS or CCD image sensor, for use in imaging applications. In some embodiments, the sensor assembly 1314 may also include an acceleration sensor, a gyroscope sensor, a magnetic sensor, a pressure sensor, or a temperature sensor.

The communication component 1316 is configured to facilitate wired or wireless communication between the device 1300 and other devices. The device 1300 may access a wireless network based on a communication standard, such as WiFi, 2G, or 3G, or a combination thereof. In an embodiment, the communication component 1316 receives broadcast signals or broadcast related information from an external broadcast management system via a broadcast channel. In an embodiment, the communication component 1316 also includes a near field communication (NFC) module to facilitate short-range communication. For example, the NFC module may be implemented based on a radio frequency identity (RFID) technology, an infrared data association (IrDA) technology, an ultra-wideband (UWB) technology, a Bluetooth (BT) technology, and other technologies.

In an embodiment, the device 1300 may be implemented by one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described method.

In an embodiment, there is also provided a non-transitory computer-readable storage medium including instructions, such as included in the memory 1304, executable by the processor 1320 of the device 1300 to perform the method described above. For example, the non-transitory computer-readable storage medium may be a ROM, a RAM, a CD-ROM, a magnetic tape, a floppy disc, an optical data storage device, and the like.

In the technical solutions according to the embodiments of the present disclosure, it can be determined whether to remove the stored failed information based on the trigger condition of the conditional handover, so as to ensure that the stored link failure information is sent to the base station. The base station can thus identify the network environment where the link failure occurs in the UE, which is helpful for the base station to optimize the network.

Those skilled in the art will be aware of other embodiments of the disclosure after considering the specification and practicing the disclosure disclosed herein. The specification and examples are to be regarded as exemplary only, with the true scope of the disclosure being indicated by the following claims.

It may be appreciated that the present disclosure is not limited to the precise structures described above and illustrated in the accompanying drawings, and the scope of the present disclosure is limited only by the appended claims.

It should be noted that, relational terms such as "first" and "second" in the disclosure are used only to distinguish an entity or operation from another entity or operation, and do not necessarily require or imply any actual relationship or sequence existed between these entities or operations. The terms "comprises", "includes" or any other variation thereof are intended to encompass non-exclusive inclusion such that a process, a method, an article or a device comprising a list of elements includes not only those elements, but also other elements not expressly listed, or also includes elements inherent to such process, method, article or device. Without more limitations, an element qualified by the sentence "comprising a . . . " does not preclude a presence of additional identical elements in the process, method, article or device that includes the element.

The methods and apparatuses according to the embodiments of the present disclosure have been described in detail above, and specific examples are used to illustrate the principles and implementations of the present disclosure. At the same time, for those skilled in the art, according to the concept of the present disclosure, there may be changes in the specific implementation and application scope. In summary, the contents of this specification should not be construed as limiting the present disclosure.

What is claimed is:

1. A method for processing link failure information, comprising:

in response to a conditional handover failure, determining by a terminal, a trigger condition of the conditional handover; and determining by the terminal, whether to remove stored link failure information based on the trigger condition;

wherein the trigger condition comprises a condition selected from the group consisting of a radio link failure, a conditional handover failure, a handover failure, and a network environment of the terminal satisfying a preset condition of the conditional handover.

2. The method of claim 1, wherein the trigger condition is a radio link failure, and determining whether to remove stored link failure information based on the trigger condition comprises:

retaining the stored link failure information.

3. The method of claim 2, wherein determining whether to remove stored link failure information based on the trigger condition further comprises:

storing information for another link failure, wherein the information for another link failure comprises a reason for another link failure, the reason being a conditional handover failure after the radio link failure.

4. The method of claim 1, wherein the trigger condition is a conditional handover failure, and determining whether to remove stored link failure information based on the trigger condition comprises:

retaining the stored link failure information.

5. The method of claim 4, wherein determining whether to remove stored link failure information based on the trigger condition further comprises:

storing information for another link failure, wherein the information for another link failure comprises a reason for another link failure, the reason being another conditional handover failure after the conditional handover failure.

6. The method of claim 1, wherein the trigger condition is a handover failure, and determining whether to remove stored link failure information based on the trigger condition comprises:

retaining the stored link failure information.

7. The method of claim 6, wherein determining whether to remove stored link failure information based on the trigger condition further comprises:

storing information for another link failure, wherein the information for another link failure comprises a reason for another link failure, the reason being a conditional handover failure after the handover failure.

8. The method of claim 1, wherein the trigger condition is the network environment of the terminal satisfying the preset condition of the conditional handover, and determining whether to remove stored link failure information based on the trigger condition further comprises:

removing the stored link failure information; and
   storing information for another link failure, wherein the information for another link failure comprises a reason for another link failure, the reason being the conditional handover failure.

9. The method of claim 1, before determining the trigger condition of the conditional handover, the method further comprises:

receiving a preset condition of the conditional handover sent by a base station.

10. An electronic device, comprising:

a processor; and
    a memory for storing instructions executable by the processor;

wherein the processor is configured to:
in response to a conditional handover failure, determine a trigger condition of the conditional handover; and
determine whether to remove stored link failure information based on the trigger condition;
wherein the trigger condition comprises a condition selected from the group consisting of a radio link failure, a conditional handover failure, a handover failure, and a network environment of the terminal satisfying a preset condition of the conditional handover.

11. The electronic device of claim 10, wherein the trigger condition is a radio link failure, and the processor is further configured to retain the stored link failure information.

12. The electronic device of claim 11, wherein the trigger condition is the radio link failure, and the processor is further configured to store information for another link failure, wherein the information for another link failure comprises a reason for another link failure, the reason being a conditional handover failure after the radio link failure.

13. The electronic device of claim 10, wherein the trigger condition is a conditional handover failure, and the processor is further configured to retain the stored link failure information.

14. The electronic device of claim 13, wherein the trigger condition is the conditional handover failure, and the processor is further configured to store information for another link failure, wherein the information for another link failure comprises a reason for another link failure, the reason being another conditional handover failure after the conditional handover failure.

15. The electronic device of claim 10, wherein the trigger condition is a handover failure, and the processor is further configured to retain the stored link failure information.

16. The electronic device of claim 15, wherein the trigger condition is the handover failure, and the processor is further configured to:
store information for another link failure, wherein the information for another link failure comprises a reason for another link failure, the reason being a conditional handover failure after the handover failure.

17. The electronic device of claim 10, wherein the trigger condition is the network environment of the terminal satisfying the preset condition of the conditional handover, and the processor is further configured to:
remove the stored link failure information; and
store information for another link failure, wherein the information for another link failure comprises a reason for another link failure, the reason being the conditional handover failure.

18. The electronic device of claim 10, wherein the processor is further configured to:
receiving a preset condition of the conditional handover sent by a base station.

19. The method of claim 1, wherein the link failure information comprises at least one of: a cell where the terminal is located when a link fails, measurement data of the cell where the terminal is located, location information of the terminal, a cell-radio network temporary identifier used by the terminal before the link fails, a reason why the link fails, or a target cell for conditional handover indicated by a base station to the terminal.

20. The electronic device of claim 10, wherein the link failure information comprises at least one of: a cell where the terminal is located when a link fails, measurement data of the cell where the terminal is located, location information of the terminal, a cell-radio network temporary identifier used by the terminal before the link fails, a reason why the link fails, or a target cell for conditional handover indicated by a base station to the terminal.

* * * * *